(12) United States Patent
Mao et al.

(10) Patent No.: US 9,106,584 B2
(45) Date of Patent: Aug. 11, 2015

(54) CLOUD INFRASTRUCTURE SERVICES

(75) Inventors: Yun Mao, Jersey City, NJ (US); Maria Fernandez, Madison, NJ (US); Changbin Liu, Philadelphia, PA (US); Jacobus Van Der Merwe, New Providence, NJ (US)

(73) Assignee: AT&T Intellectual Property I, L.P., Atlanta, GA (US)

(*) Notice: Subject to any disclaimer, the term of this patent is extended or adjusted under 35 U.S.C. 154(b) by 142 days.

(21) Appl. No.: 13/245,720

(22) Filed: Sep. 26, 2011

(65) Prior Publication Data

US 2013/0080480 A1      Mar. 28, 2013

(51) Int. Cl.
G06F 7/00    (2006.01)
H04L 12/24   (2006.01)
G06F 17/30   (2006.01)
H04L 29/08   (2006.01)

(52) U.S. Cl.
CPC ...... H04L 41/5009 (2013.01); G06F 17/30194 (2013.01); H04L 67/10 (2013.01)

(58) Field of Classification Search
CPC .......................... G06F 17/30; G06F 17/30377
See application file for complete search history.

(56) References Cited

U.S. PATENT DOCUMENTS

| | | | |
|---|---|---|---|
| 5,307,484 A | 4/1994 | Baker et al. | |
| 6,477,559 B1 | 11/2002 | Veluvali et al. | |
| 6,643,784 B1 * | 11/2003 | McCulligh | 726/18 |
| 6,718,535 B1 | 4/2004 | Underwood | |
| 6,901,440 B1 | 5/2005 | Bimm et al. | |
| 7,043,494 B1 | 5/2006 | Joshi et al. | |
| 7,100,195 B1 | 8/2006 | Underwood | |
| 7,143,107 B1 | 11/2006 | Nebres, Jr. | |
| 7,216,126 B2 | 5/2007 | Choy | |
| 7,523,127 B2 | 4/2009 | Chen-Wright et al. | |
| 7,558,847 B2 | 7/2009 | Strassner | |
| 7,689,579 B2 | 3/2010 | DeMesa et al. | |
| 7,890,547 B2 * | 2/2011 | Hotti | 707/803 |
| 7,987,228 B2 | 7/2011 | McKeown et al. | |
| 2005/0018697 A1 * | 1/2005 | Enns et al. | 370/401 |
| 2005/0021766 A1 | 1/2005 | McKeowen et al. | |
| 2005/0021866 A1 * | 1/2005 | Kang et al. | 709/248 |
| 2005/0120030 A1 | 6/2005 | Varpela et al. | |
| 2005/0235019 A1 * | 10/2005 | Yang | 707/204 |
| 2005/0254430 A1 * | 11/2005 | Clark et al. | 370/241 |

(Continued)

OTHER PUBLICATIONS

Xu Chen, et. al., "Declarative Configuration Management for Complex and Dynamic Networks", ACM CoNEXT 2010, Nov. 30-Dec. 3 2010, Philadelphia, PA USA.

(Continued)

*Primary Examiner* — Apu Mofiz
*Assistant Examiner* — Thu Nga Nguyen
(74) *Attorney, Agent, or Firm* — Hartman & Citrin LLC

(57) ABSTRACT

An aspect of the disclosed technology is a general-purpose platform that may be used to provide resilient cloud services. Tasks may be written as procedures in general-purpose programming languages that directly manipulate resources via control interfaces. In one implementation, resource states, such as router configurations and virtual machine states, associated with a cloud customer that provides communications services, may be abstracted into tables in a relational or semi-structured database. State changes that have been written to the database tables are automatically propagated by the database to appropriate customer physical devices, such as network elements, thereby implementing various customer network operations.

16 Claims, 9 Drawing Sheets

(56) References Cited

U.S. PATENT DOCUMENTS

| | | | |
|---|---|---|---|
| 2007/0061397 A1 | 3/2007 | Gregorat et al. | |
| 2007/0153771 A1 | 7/2007 | Doradla et al. | |
| 2007/0239751 A1* | 10/2007 | Wei et al. | 707/101 |
| 2008/0071793 A1 | 3/2008 | Cohen et al. | |
| 2008/0222290 A1 | 9/2008 | Le Moigne et al. | |
| 2008/0250057 A1 | 10/2008 | Rothstein et al. | |
| 2009/0018996 A1 | 1/2009 | Hunt et al. | |
| 2009/0036111 A1* | 2/2009 | Danford et al. | 455/419 |
| 2009/0300044 A1* | 12/2009 | Zheng et al. | 707/102 |
| 2009/0327230 A1* | 12/2009 | Levin et al. | 707/3 |
| 2010/0153453 A1* | 6/2010 | Knowles | 707/784 |
| 2011/0072028 A1 | 3/2011 | Rousseau | |
| 2011/0125802 A1 | 5/2011 | Van der Merwe et al. | |
| 2011/0125810 A1 | 5/2011 | Van der Merwe et al. | |
| 2011/0191303 A1 | 8/2011 | Kaufman et al. | |
| 2011/0208759 A1 | 8/2011 | Zellweger | |
| 2012/0005243 A1 | 1/2012 | Van der Merwe et al. | |

OTHER PUBLICATIONS

U.S. Appl. No. 12/623,408 Office Action dated Sep. 2011.
U.S. Appl. No. 12/623,408 Office Action dated Feb. 2012.
U.S. Appl. No. 12/623,408 Office Action dated Apr. 2012.
U.S. Appl. No. 12/623,408 Office Action dated Sep. 2012.
U.S. Appl. No. 12/623,408 Office Action dated Jan. 2013.
U.S. Appl. No. 12/623,408 Office Action dated Apr. 2013.
U.S. Appl. No. 12/623,424 Office Action dated Sep. 2011.
U.S. Appl. No. 12/623,424 Office Action dated Feb. 2012.
U.S. Appl. No. 12/623,424 Office Action dated Apr. 2012.
U.S. Appl. No. 12/623,424 Office Action dated Sep. 2012.
U.S. Appl. No. 12/623,424 Office Action dated Jan. 2013.
U.S. Appl. No. 12/623,424 Office Action dated Apr. 2013.
U.S. Appl. No. 12/830,154 Office Action dated Feb. 2012.
U.S. Appl. No. 12/830,154 Office Action dated Aug. 2012.
U.S. Appl. No. 12/830,154 Office Action dated Jan. 2013.
U.S. Appl. No. 12/830,154 Office Action dated May 2013.
Caldwell et al., The Cutting Edge of IP Router Configuration, Proc. 2nd ACM Workshop on Hot Topics in Networks, Nov. 20, 2003, Cambridge, Mass.
Notice of Allowance mailed Nov. 13, 2013 in U.S. Appl. No. 12/830,154.

* cited by examiner

*FIG. 4*

```
1   class VM(LogicalModel):
2       name = Attribute(str)
3       state = Attribute(VMState)
4       mem = Attribute(int)
5       @primaryKey # the primary key is attribute 'name'
6       def id(self): return self.name
7   ...
8   class VMHost(LogicalModel):
9       hostname = Attribute(str)
10      hostmem = Attribute(int)
11      vms = Many(VM)
12      @constraint
13      def hostmemLimit(self):
14          if sum(vm.mem for vm in self.vms) >= self.hostmem:
15              yield ("no enough physical memory", self)
16      @action
17      def startVM(self, ctxt, name):
18          self.vms[name].state = VMState.On
19          ctxt.appendlog(action="startVM", args=[name],
20                         undo_action="stopVM", undo_args=[name])
21  ...
22  class VMRoot(LogicalModel):
23      hosts = Many(VMHost)
24  ...
25  class Root(LogicalModel):
26      vmRoot = One(VMRoot)
27      storageRoot = One(StorageRoot)
28  ...
29  @proc
30  def spawnVM(root, vmName, targetHost, image_template):
31      vmImage = vmName + "_img"
32      root.storageRoot.hosts[targetHost]\
33          .cloneImage(image_template, vmImage)
34      root.vmRoot.hosts[targetHost].createVM(vmName, vmImage)
35      root.vmRoot.hosts[targetHost].startVM(vmName)
```

FIG. 5

| log record # | resource object path | action | args | undo action | undo args |
|---|---|---|---|---|---|
| 1 | /storageRoot/targetHost | cloneImage | [image_template, vmImage] | removeImage | [vmImage] |
| 2 | /vmRoot/targetHost | createVM | [vmName, vmImage] | removeVM | [vmName] |
| 3 | /vmRoot/targetHost | startVM | [vmName] | stopVM | [vmName] |

FIG. 7A

```
1   def txnManager(initState, inputQueue):
2     # initState: initial state at the logical layer
3     # inputQueue: a producer-consumer queue
4     todoQueue = Queue() # empty FIFO queue
5     activeTxns = {} # empty hash table
6     lockManager = LockManager() # multi-granularity locking
7     states = [initState]
8     while True:
9       txn = inputQueue.get() # block if inputQueue is empty
10      if txn.stage == Init:
11        todoQueue.push_tail(txn)
12        if len(todoQueue) > 1:
13          continue # more pending txns, no need to schedule
14      else: # finished from physical thread execution
15        discardStates(states, txn.id, txn.stage)
16        lockManager.remove(txn.locks)
17        txn.output.send(txn.result, txn.stage)
18        del activeTxns[txn.id]
19      while not todoQueue.empty():
20        nextTxn = todoQueue.head()
21        parallelizable = True # assume this at the start
22        firstLogs = None
23        for state in states: # start simulations
24          try:
25            logs, locks, newstate = simulate(state, nextTxn)
26            if firstLogs is None: # 1st time in simulation
27              firstLogs = logs; nextTxn.locks = locks
28              parallelizable = lockManager.conflictWith(locks)
29            else:
30              parallelizable = sameLog(firstLogs, logs)
31            break if not parallelizable
32            check_constraint(newstate)
33            states.append(newstate)
```

```
       CONTINUED OF FIG. 7A
34  except err:
35      nextTxn.stage = Aborted
36      discardState(states, nextTxn.id, Aborted)
37      nextTxn.output.send(err, Aborted)
38      todoQueue.pop_head()
39      break
40  # after simulations
41  if nextTxn.stage is Aborted:
42      continue # keep on scheduling next txn
43  if not parallelizable:
44      break # stop processing, wait till a txn finishes
45  todoQueue.pop_head()
46  activeTxns[nextTxn.id] = nextTxn
47  lockManager.add(nextTxn.locks)
48  createPhysicalThread(nextTxn)
```

FIG. 8

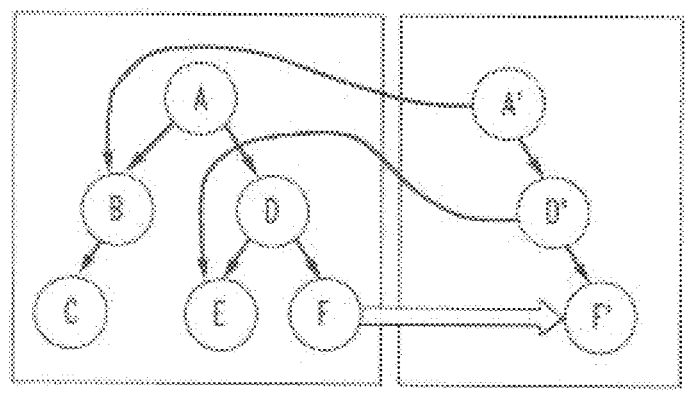

CLOUD INFRASTRUCTURE SERVICES

RELATED APPLICATIONS

This application is related to U.S. patent application Ser. No. 12/623,408, now abandoned, filed Nov. 21, 2009, entitled "Operating a Network Using Relational Database Methodology"; U.S. patent application Ser. No. 12/623,424, now abandoned, filed Nov. 22, 2009, entitled "Operating a Network Using Relational Database Methodology"; and U.S. patent application Ser. No. 12/830,154, now U.S. Pat. No. 8,682,940, filed Jul. 2, 2010, entitled "Operating a Network Using Relational Database Methodology"; all of which are hereby incorporated by reference into this application.

BACKGROUND

As very high bandwidth transmission technology has come of age, computations requiring large computer resources are often performed on shared computer facilities that are not local, but are rather accessed through a network. This obviates the need to obtain costly local computers for computations that don't require dedicated computer resources—for example, computations that are performed infrequently. The availability of shared computer resources gives smaller organizations access to computer resources that such organizations cannot afford to purchase. This general concept of performing computation on network-accessed resources, rather than on local resources, is called "cloud computing"—because it takes place in the network "cloud".

With the advent of cloud computing, organizations with large computing resources have offered other parties access to these computational resources. Such services, which enable one organization to use the computational infrastructure of another organization, are sometimes called "Infrastructure as a Service" or "IaaS".

The IaaS cloud computing model has become increasingly more attractive as cloud users become more comfortable entrusting their workloads to the cloud; as equipment vendors provide multi-user versions of their products to support deployment in the cloud; and, as service providers roll out new sophisticated services. IaaS cloud platforms provide on-demand, near-instant access to seemingly unlimited computational resources. Operation of these resources may be realized through virtualization or logical partitioning of the physical resources, and the subsequent careful management, or orchestration, of the virtualized cloud resources. Such management of cloud computing resources is referred to as "cloud orchestration".

Cloud orchestration includes the management and manipulation of computational, storage and network cloud resources to realize user requests, while at the same time realizing the operational objectives of the cloud service provider. Users indirectly orchestrate the cloud via provider Application Programming Interfaces ("API"s) driven by their needs and workloads, while providers internally orchestrate the cloud according to their operational objectives, e.g., cost reduction through consolidating physical resources or improving the ability to fulfill service level agreements ("SLA"s) by dynamically reallocating compute cycles and network bandwidth.

This highly dynamic environment makes cloud orchestration a challenging problem. Not only should user and operator requirements be satisfied as described above, but this needs to be accomplished while servicing large numbers of simultaneous user requests, enforcing policies that reflect service and engineering rules, and performing fault and error handling. Accordingly, implementing Infrastructure-as-a-Service requires a sophisticated cloud control framework to orchestrate cloud resource provisioning, configuration, utilization and decommissioning across a distributed set of physical resources. Additionally, the increasing scale and sophistication of cloud services have imposed even greater challenges to ensure correctness and deal with errors with minimum human intervention.

SUMMARY

An aspect of the disclosed technology is a general-purpose platform that may be used to provide resilient cloud services. In one embodiment of the disclosed technology, orchestration tasks may be written as procedures in general-purpose programming languages that directly manipulate resources via control interfaces. In one implementation, resource states, such as router configurations and virtual machine states, associated with a cloud customer that provides communications services, may be abstracted into tables in a relational or a semi-structured database. Network management operations may then be represented as a series of transactional database queries and updates. State changes, that have been written to the database tables are automatically propagated by the database to appropriate customer physical devices, such as network elements, thereby implementing various customer network operations.

In an embodiment of the disclosed technology, the database has two views of the customer cloud resources—a "physical layer" view reflecting the actual status of the customer devices, both physical and virtual, and a "logical layer" view representing the network with contemplated changes having been made. In this way, contemplated changes in the customer network can be tested in the logical layer before implementation in the physical layer, thereby ensuring that no problems will arise either in the customer network or the cloud upon implantation of the contemplated changes.

In alternative embodiments of the disclosed technology, system-wide constraints and exception handling may be implemented to avoid errors that can cause the system to fail, or to ignore errors. Additionally, in order to avoid destructive competition between concurrent tasks that utilize shared resources, deadlock-free, concurrency control may be implemented.

The disclosed technology can be applied, for example, to customer applications involving communication networks, manufacturing architectures, computing facilities and other applications that involve physical devices that would benefit from computing resources.

In one embodiment of the disclosed technology, a method comprises the following steps: a) in a memory device, at an address associated with a cell in a logical-layer database, changing data representative of a characteristic associated with a physical device; analyzing, in the logical-layer database, the effect of the changing of the data representative of the characteristic associated with the physical device; and transmitting, to the physical device, information related to the changing, in the logical-layer database, of the data representative of the characteristic associated with the physical device.

In other embodiments the analyzing step further includes: determining whether data comprising the logical-layer database is consistent with data comprising the physical-layer; determining whether a predetermined constraint is satisfied upon a plurality of changes of data representative of a plurality of physical devices, and/or determining whether data comprising the logical-layer database is consistent with data comprising the physical-layer.

In yet other embodiments the plurality of changes of data are restricted to changes of data that have a likelihood, greater than a predetermined likelihood, of succeeding in the physical layer. In certain embodiments the method is performed by an entity different from the entity that owns the physical device. Alternative embodiments involve physical devices that are elements in a communications network, a computing facility or a manufacturing facility. The method may be performed at a single server and/or the database can be a semi-structured database.

An alternative embodiment of the invention is a non-transitory computer-readable medium having stored thereon a plurality of instructions, the plurality of instructions including instructions which, when executed by a processor, cause the processor to perform the various method embodiments.

BRIEF DESCRIPTION OF THE DRAWING

FIG. 4 is a sample code listing in one embodiment of the disclosed technology.

FIG. 5 is an example of the execution log for spawnVM in one embodiment of the disclosed technology.

FIG. 7A-7B are an example of pseudo code of the transaction manager in one embodiment of the disclosed technology.

FIG. 8 is an example of copy-on-write when updating node F in one embodiment of the disclosed technology.

DETAILED DESCRIPTION

Overview of the Disclosed Technology

In one aspect of the disclosed technology, states associated with resource objects are stored in both "logical layer" and "physical layer". The physical layer provides a unified abstraction of the physical devices. States in the physical layer reside on the actual devices, and can be manipulated, based on physical layer data, from the physical actions which are implemented with device-specific APIs. States in the logical layer are replicas of the physical layer counterparts, stored in a database. All actions in the physical layer have corresponding actions in the logical layer. By evaluating actions and constraints in the logical layer, before physical deployment of a transaction, the likelihood that the transaction will result in illegal resource manipulations, or misconfigurations is decreased. In a specific embodiment of the disclosed technology, transaction methodology, using physical and logical layers, is applied to cloud resource orchestration. Semantics and algorithms satisfy the associated requirements beneficial to the implementation of such a platform.

In accordance with another aspect of the disclosed technology, changes in a characteristic of a physical device are executed as a series of transactional database queries and updates. In this aspect of the technology, orchestration transactions are written as typical procedures in an imperative language to automatically handle the execution in the cloud in a transactional manner. This enables cloud service developers to work with logical units that may be grouped into cloud-resource-access-units and -control units. These units then can execute with atomicity, consistency, isolation, and durability (ACID) guarantees. Atomicity guarantees that either all state transitions in a transaction are performed or none are. If an error happens during the execution, the entire transaction is rolled back. Consistency guarantees that all the constraints are satisfied regardless of whether a transaction is committed or aborted. Isolation guarantees that two concurrent transactions do not interfere with each other in any way. Durability ensures that committed transactions will survive system crashes.

After presenting high level descriptions of the disclosed technology below, we present exemplary transactional semantics, apply certain algorithms and data structures in transaction processing that meet the requirements for orchestration, and discuss a specific implementation of the system.

A SCHEMATIC ILLUSTRATION OF AN EMBODIMENT OF THE DISCLOSED TECHNOLOGY

Figure 1:
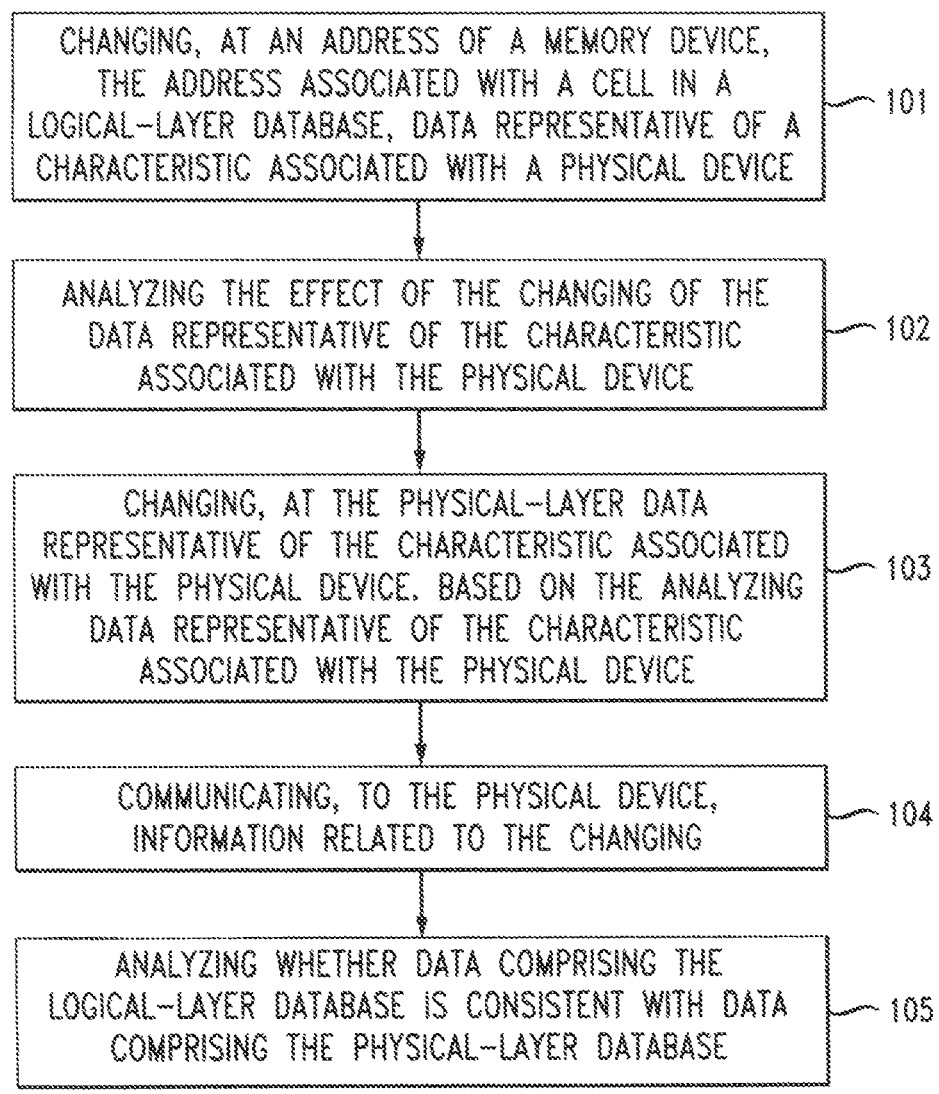
FIG. 1 is a schematic representation of one embodiment of the disclosed technology.

FIG. 1 is a high-level schematic representation of a method embodiment of the disclosed technology. In FIG. 1, at 101, data, representative of a characteristic associated with a physical device, is changed. The data is located at an address, of a memory device, that is associated with a cell in a logical-layer database. At 102, the effect of changing the data, representative of the characteristic associated with the physical device, is analyzed. At 103, data, representative of the characteristic associated with the physical device, is changed, based on the analyzing done at step 102. The data is located at an address of a memory device associated with a cell of the physical-layer. At 104, information related to the change made at 103 is communicated, in alternative embodiments, to the physical device. Finally, in other embodiment, at 105, data comprising both the logical and physical layer databases may be analyzed for consistency.

A SIMPLE ILLUSTRATION OF ASPECTS OF THE DISCLOSED TECHNOLOGY

To illustrate some aspects associated with cloud orchestration that are addressed by the disclosed technology, we describe a simplified version of a service that IaaS providers might offer. In this illustration, a customer may spawn new VMs from an existing disk image, and later start, shutdown, or delete the VMs. To ensure traffic isolation, two VMs are placed on the same layer-2 broadcast domain (e.g., within a VLAN) if and only if they belong to the same customer. This illustration is realized within a data center, with storage servers capable of exporting block devices via network compute servers that can create VMs, and a programmable switch layer with VLAN capability. The provider also may choose to migrate VMs among computer servers to balance or consolidate workload.

Customer-facing cloud control mechanisms are usually highly abstracted, hiding the realization complexity on the provider side. In particular, cloud orchestration requires many low-level operations to be performed in sequence on a collection of heterogeneous devices and in the presence of concurrent client requests. For instance, to add a new virtual machine ("VM") into a cloud-based web service's front end pool, the cloud will likely configure physical ports on the switches to allow access into proper VLANs, set up software bridges on the physical server to tap into correct VLANs for inter-VM access, duplicate the VM image from the template on the storage server, create a VM configuration on the compute server, and finally start the VM by controlling the hypervisor.

Unhandled Errors

During the multi-step process to provision a VM, any error would prevent the client from getting the VM. Existing solutions typically handle commonly expected errors in an ad-hoc manner. When unanticipated errors occur, they either choose to fail-stop, entering an intermediate state, or to ignore the errors, leading to undefined behavior. Either way, without proper error handling, the system could end up in unknown and usually undesirable states, causing security issues or resources under-utilization. For example, a left-over configuration on a switch may grant a VM access to other customers' VLAN, while an unused cloned VM disk image wastes storage without a VM spinning on top. However, in one aspect of the disclosed technology, the VM provisioning is executed as an atomic entity. The all-or-nothing guarantee then eliminates the intermediate state problem, providing a well-defined way to recover from unexpected errors.

Policy Violation

Cloud orchestration is partly driven by user requests, but at the same time should be guided and constrained by high-level cloud-management policies. For example, the cloud may want to limit the number of VMs and the total allocated memory for the VMs on a physical server in order to guarantee VM performance and prevent errors. Enforcing these policies can be challenging as global states must be acquired and reasoned. Most solutions to this problem are implemented as condition checks (if-then-else), scattered in the code base. Even when violations are detected, the reconciliation mechanisms are usually ad-hoc—fail-stop is common and problematic as shown in the previous example. However, in one aspect of the disclosed technology, transactions are used to specify policies as integrity constraints. The policies are thereby automatically enforced.

Race Condition

Handling cloud management operations in a timely (at least near real time, if not real time) manner is extremely important to adapt cloud-based services to dynamic workloads. A naïve solution, that performs such operations whenever requested, is problematic due to potential race conditions. For example, consider two independent operations of creating a VM with 1 GB memory. An automation script may check the constraint of whether the target physical server has sufficient memory. If performed simultaneously, the checks for two creation tasks might both succeed on a server with 1.5 GB free memory, thus causing the server to overload when the VMs are actually created. A conservative solution for eliminating these race conditions is to perform operations sequentially. This solution, however, significantly reduces the rate at which cloud operations can be performed. In one aspect of the disclosed technology, concurrency control using transaction processing offers automatic parallelism without race conditions, while ensuring that conflicting transactions are serialized.

Design Considerations

In one embodiment, the disclosed technology is guided by a number of principles. First, resource volatility is a primary concern. Given the scale, dynamics, and complexity of the cloud environment, failures and malfunction of physical resources may happen at any time. Some of these changes are hard to detect, given that they may have occurred due to "out-of-band" configurations not regulated by the cloud. Hence, in one aspect of this technology, error handling is an integral part of the design. Transactional semantics are provided to guarantee ACID properties on operations in the cloud, and also to provide reconciliation mechanisms to ensure that the cloud maintains a consistent logical view of cloud resources that is in sync with actual physical resources even when actual physical operations fail.

Prioritize Safety

The disclosed technology is designed to work in a multi-tenant cloud environment, where there can be several concurrent orchestration operations being issued by customers and cloud operators. In such a setting, it is possible for an illegal orchestration operation to result in the disruption of cloud services (for instance, VLAN misconfiguration due to previous failures or moving a VM to an overloaded machine). These mishaps are difficult to isolate in the presence of several concurrent operations. The end-results, especially when combined, are costly (e.g., violating service level agreements ("SLAs")) and time-consuming to debug and fix in a live deployment.

In one aspect of the disclosed technology, when a trade-off has to be made between performance and safety, safety is typically favored. For instance, in one aspect of the disclosed technology extensive analysis is performed on cloud operations to ensure that they are logically safe (i.e., no constraint violations or conflicting operations), before actually applying these changes on physical resources. Though computationally expensive at times, these checks ensure that costly configuration errors that occur due to interactions across different orchestration operations are avoided.

Centralized Management—Finally, in one aspect of the disclosed technology, design simplicity may be obtained by adopting an architecture where orchestration decisions are centralized at a single server node. The scalability implication is that the orchestration state for all managed physical resources preferably should be able to fit into the physical memory of a single server. This assumption allows focus on guaranteeing safety and reliability without having to deal with complexities that come with efficient out-of-core operations (such as using a buffer pool or similar virtual storage to efficiently page data structures in and out of memory), or adopt a more complex management approach that requires distributed transactions and state partitioning. This assumption is realistic, given that an orchestration state usually only contains configuration and control information of the resources, which typically ranges from a few bytes to 100K bytes per resource. If we assume that each VM control state costs 100 bytes, then in a data center with 10,000 servers, 10 VMs per server only takes 10 MB memory—a very small footprint by today's standard. Another benefit of such a centralized scheme is that global constraints can be more easily enforced as all resources are described and managed in the same place.

An Exemplary Architecture

Figure 2:
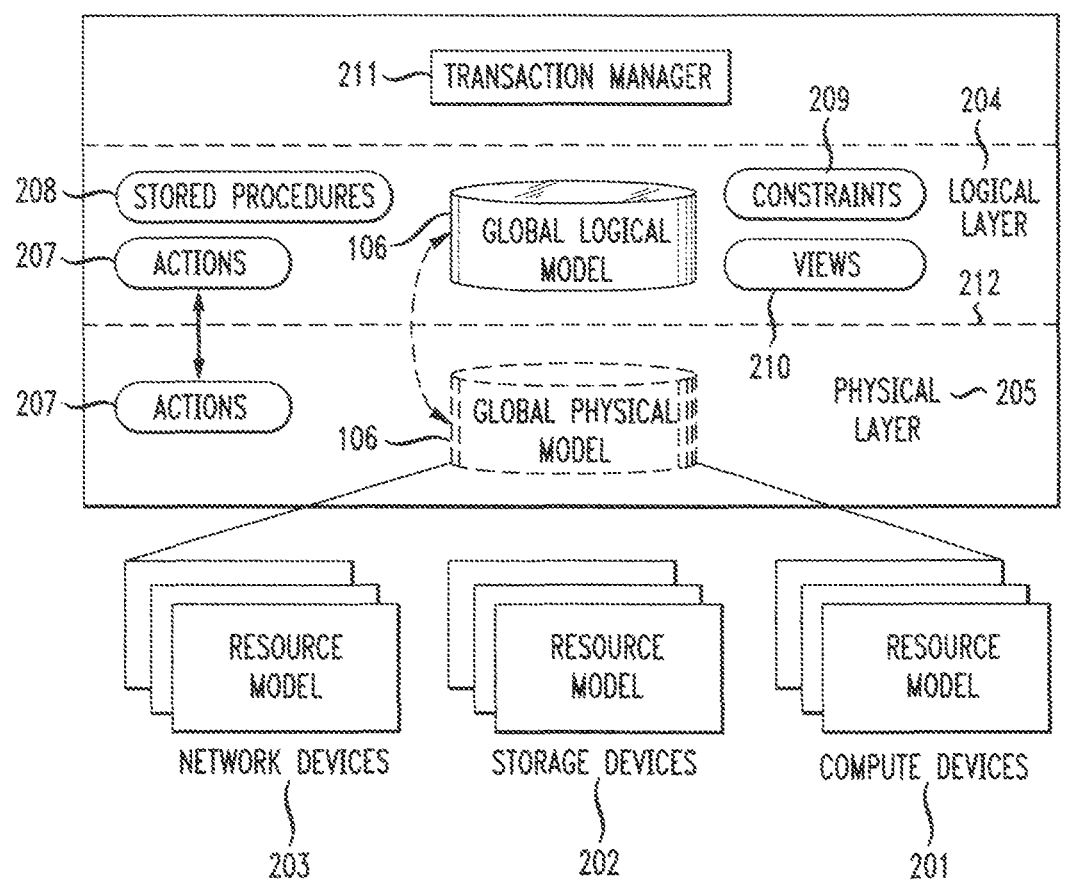
FIG. 2 is a schematic representation of one embodiment of the architecture of the disclosed technology.

An exemplary architecture for one embodiment of the disclosed architecture is shown in FIG. 2. A centralized controller node, 200, maintains and manages a data repository of some or all of the resources, that exist in a physical system and that are being managed in accordance with the disclosed technology. These resources include compute, storage and network devices 201, 202, and 203 respectively, as shown at the bottom of the figure.

In one aspect of the disclosed technology, the state associated with every resource object is stored in the physical devices as the physical layer, 205, and replicated at an in-memory database as the logical layer 204. The physical layer 205 provides a unified abstraction of the physical devices.

States in the physical layer 205 reside on the actual devices, and can be manipulated from the actions that are implemented with device-specific APIs. States in the logical layer 204 are replicas of the physical layer 205 counterparts.

Both the logical layer 204 and physical layer 205 contain their own global views of the entire system, 106, ("the global model") as well as all actions, 207. Additionally, the logical layer 204 has predefined orchestration procedures, 208, constraints, 209, and views, 210. Finally, user specified actions are executed by the transactions manager, 211. All actions in the physical layer 205 have corresponding actions in the logical layer 204.

There are two primary reasons for the logical/physical separation. First, this approach explicitly embraces the volatile nature of the physical resources, and the two layers may go out of sync. The separation allows the system to apply repair/reload strategies from the persistently stored state in the logical layer 204 when changes (e.g., due to failures) occur in the physical layer 205.

Second, in one aspect of the disclosed technology, during the execution of orchestration procedures, the operation is first performed (or emulated) only in the logical layer 204. This, for example, allows global constraints 209 to be verified before subsequently performing the operations at the physical layer 205. Performing these functions at the logical layer 204 is much more efficient than doing so directly at the physical layer 205, especially if roll back is required. The separation also brings the advantage of rapid testing and debugging, as discussed below.

To implement the flexibility that can come with both a physical layer 205 and logical layer 204, in one embodiment of the disclosed technology, the physical and logical layers 205,204 do not have to be in synchronization at all times. This aspect of the disclosed technology is represented in FIG. 2 by the dotted line at 212, representing "weak consistency" between the logical and physical layers 204, 205.

Data Model

Figure 3:
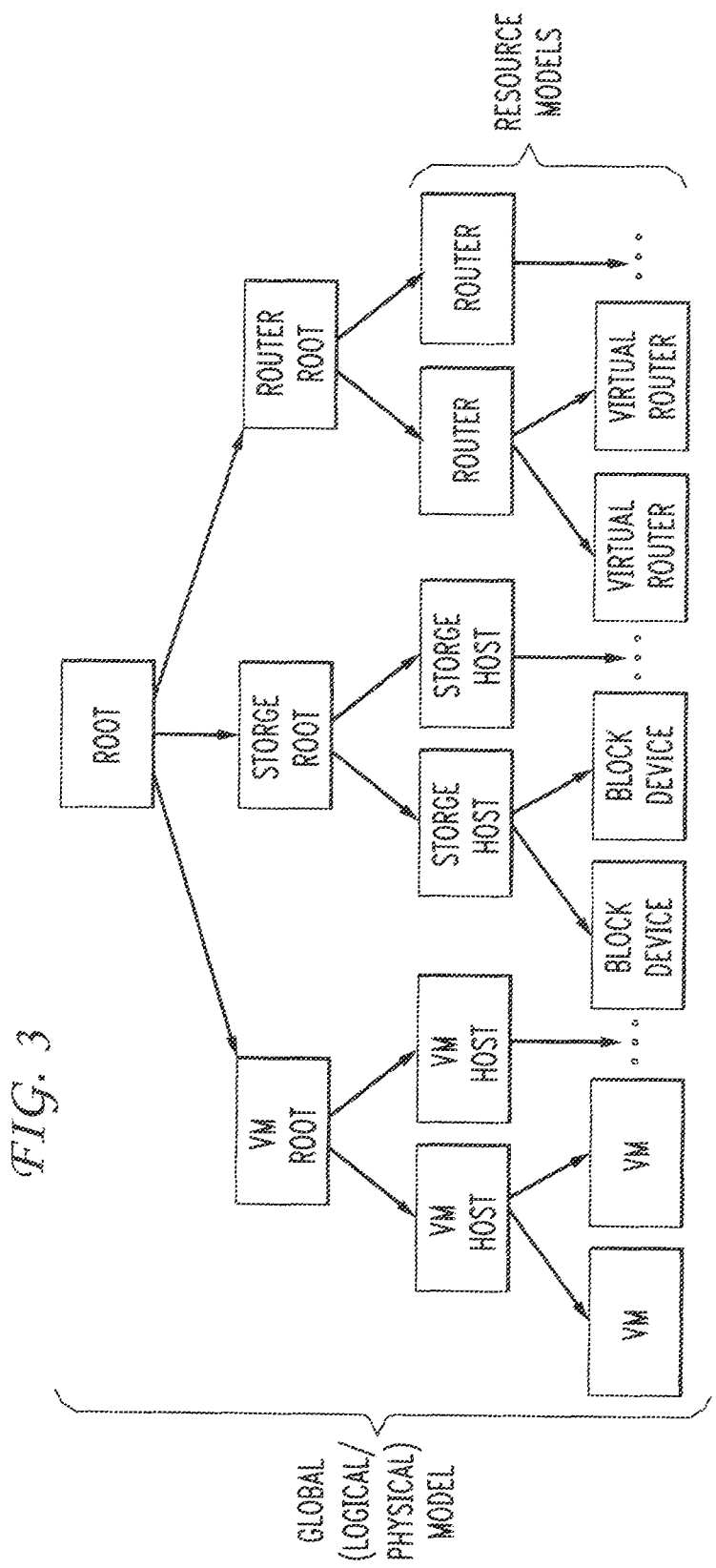
FIG. 3 is an exemplary schematic instance of the data model in one embodiment of the disclosed technology.

In one aspect of the disclosed technology, a controller adopts a hierarchical data model in which data are organized into a tree-like structure, as illustrated in FIG. 3. As shown in FIG. 3, the global logical and physical models, as well as the resources models, depicted in the illustrative architecture shown in FIG. 2, maps only to the bottom levels of the data model. Each tree node is an object representing an instance of an entity. An entity may have multiple attributes of primitive types, and multiple one-to-many and one-to-one relations to other entities, which occur as children nodes in the tree. An entity must have a primary key defined as a function of its attributes that uniquely identifies an object among its sibling objects in the tree.

FIG. 4 shows exemplary code that presents definitions of objects in the logical layer 204, as represented in FIG. 3. The code is written in Python syntax. Although incomplete, the code is very similar to the real code used and we will use FIG. 4 for illustrative purposes. In the code of FIG. 4, each entity instance is defined as a class object, and children instances are referenced as one attribute within the object. For example. "Root" denotes the root of the tree, and it has vmRoot, storageRoot, etc. as children. The child, vmRoot, itself has many VMHosts, which are comprised of a physical machine and several guest VMs (VM). In this example, within each model, there are four decorators to define views (@view), constraints (@constraint), actions (@action), or stored procedures (@proc) which are discussed below.

Views and Constraints.

In one embodiment of the disclosed technology, a user can specify views as predefined queries to reason about the current system state at a global level of abstraction. Views provide read-only APIs to the resources. Constraints are special views, which specify the policies that reflect service and engineering rules. A constraint is satisfied if and only if it evaluates to an empty list. Otherwise, the list should contain information such as violation messages to help pinpoint the reasons behind the violations. Constraints define the safety property of the orchestration, and one embodiment of the disclosed technology automatically enforces them during runtime execution. A constraint example is described in lines 12-15 of FIG. 4, dictating that each physical host must not over-subscribe the physical memory resources so that the sum of memory sizes in the hosted VMs exceeds the physical memory size.

Actions.

In one embodiment of the disclosed technology, the concept of action is introduced, which models an atomic operation on a resource. Any manipulation of resources is referred to as write actions. Actions generalize the myriad APIs, ranging from file-based configurations, command-line interfaces (CLIs), to APIs, like Remote Procedure Calls ("RPC") APIs, provided by vendors to control the physical resources. Each action must be defined twice: once at the physical layer, which is transformed to the underlying API calls provided by the vendors, and the other at the logical layer, which describes the state transition in the data model. Preferably, an action is also associated with a corresponding undo action. Undo actions are used to roll back transactions. For example, lines 16-18 in FIG. 4 define the action startVM, which boots up a VM. Inside startVM, lines 19-20 define its corresponding undo action stopVM. It is recorded to the log within the execution context ctxt at runtime.

Stored Procedures.

In one embodiment of the disclosed technology, a user specifies the orchestration logic as stored procedures composed of queries, actions and other procedures to orchestrate cloud resources. They are executed by the transaction manager that enforces ACID properties. For instance, in FIG. 4 the example code on lines 29-35 define a stored procedure that spawns a VM. The procedure consists of three sequential actions: cloning the VM storage (cloneImage) from an image template, provisioning the VM on the target host (createVM), and then starting the newly created VM (startVM).

Transactional Orchestration

In one embodiment of the disclosed technology, transactions are a major aspect of orchestration. In an exemplary embodiment, the orchestration request (i.e., to execute a stored procedure as a transaction) is sent to a controller via an RPC call. In this embodiment a transaction manager ensures that each transaction is executed with the ACID properties and returns the result when the transaction is finished. Alternatively, a transaction can be executed in a non-blocking fashion—a transaction ID is returned when the request is received, and the result can be fetched later by the client using the ID.

Transaction Types.

A transaction is classified by its execution target layer as logical-only, physical-only, or synchronized, the latter meaning it is executed at both layers. In one embodiment of the disclosed technology, most orchestration tasks are synchronized transactions, because their purpose is both to satisfy constraints defined in the logical layer and to effect state change in the physical layer.

In some embodiments of the disclosed technology; logical-only and physical-only transactions are used when the two layers are out-of-sync. Such a cross-layer inconsistency may happen for many reasons, such as out-of-band changes to physical devices or device crash.

Semantics

In one embodiment of the disclosed technology the resource state is managed at both the physical and logical layer 205, 204. At the logical layer 204, one embodiment of the disclosed technology provides strong ACID properties that resemble database transactions. As indicated above, atomicity guarantees that either all state transitions in a transaction are performed or none are. If an error happens during the execution, the entire transaction is rolled back. Consistency guarantees that all the constraints are satisfied regardless of whether a transaction is committed or aborted. Isolation guarantees that two concurrent transactions do not interfere with each other in any way, i.e., as if both had executed serially. This is also known as the serializable isolation level in databases. As a result, in an exemplary embodiment of the disclosed technology, reads are only granted to committed data and are repeatable, and a resource object may only have one writer at a time to perform state transition by calling its actions. Durability ensures that committed transactions will survive system crashes.

At the physical layer 205, because of its volatile nature, ACID properties can often only be maintained in a weak, best effort fashion. For example, an unexpected system reboot due to power outage will lose all VM state, so that consistency and durability guarantees might be broken. However, keeping the state in the logical layer 204 helps to recover the lost state at the physical layer 205.

Transaction Manager Design Considerations

In the following, we will discuss the execution of orchestration transactions and how one embodiment of the disclosed technology handles failures and volatility at the physical layer 205. We describe an exemplary design of the transaction manager that executes orchestration procedures. We start from a simple case with only synchronized transactions sequentially executed, and proceed to concurrent transaction executions, logical-only and physical-only transaction handling. We then present opportunistically scheduled transactions as an optimization, and discuss the semantics and complexity of the transactions.

Sequential Execution

In this embodiment of the disclosed technology, the execution of a synchronized transaction occurs in two phases. We denote $S_0$ as the entire state in the logical layer before a transaction, t, starts. In phase 1, all operations in the transaction are executed (i.e., simulated) at the logical layer 204. During the execution, an execution log is recorded. We use the spawnVM procedure from FIG. 4 to show how a transaction is executed: FIG. 5 contains an execution log after phase 1.

At the end of phase 1, the logical state is transitioned to $S_1=t(S0)$. All integrity constraints are checked. If any constraint is not satisfied, the transaction is aborted, and the logical layer 204 is rolled back to $S_0$. This execution semantics guarantees that before a transaction begins and after it commits, the logical model is internally consistent, i.e., all integrity constraints are satisfied. The approach matches our "safety-first" principle. It provides the benefit that system misconfiguration and illegal operations are denied before the physical resources are touched, thus avoiding the overhead of unnecessary and expensive state transitions of physical resources.

If phase 1 of a transaction succeeds, phase 2 may be executed at the physical layer 205. Since all state changes have already been handled in the logical model in phase 1, during phase 2 all the actions in the execution log may be simply replayed, executing the physical variant of each action. If all the physical actions succeed, the transaction returns as committed.

If any action fails during phase 2, the transaction may be aborted in both layers. At the logical layer 204, the state is rolled back to the original state $S_0$, as it would if phase 1 had been aborted. At the physical layer 205, the undo actions for all actions that have successfully executed are identified, and may be executed in reverse chronological order. To achieve atomicity of transactions, each action in a transaction must have a corresponding undo action. If an action does not have one, it can only be executed stand-alone, but not within a transaction.

Some actions are not directly reversible because they delete resource states permanently, for example removing a VM image. In this case the challenge may be addressed as follows: During the first phase of execution, i.e., when operations are limited to the logical layer 204, the delete action is recorded in the execution log as renaming (rather than deleting) the VM image. The appropriate undo action is then to restore to the old image name. An extra column on the log as cleanup action is to actually delete the renamed image. Cleanup actions are deferred until all other actions have been successfully executed in phase 2. Errors occur during cleanup actions do not cause a transaction to abort.

In this example, the physical actions are executed on the objects identified by their paths in the log. If, for example, the first two actions succeed, but the third one fails the undo actions recorded in log, record #2 followed by record #1, are executed to roll back the transaction. As a result, the VM configuration and cloned VM image are removed.

Once all undo actions complete, the transaction is terminated as aborted. If an error occurs during undo, the transaction is terminated as failed. In this case, the logical layer 204 is still rolled back to $S_0$, however, there may be inconsistency between the physical and logical layers 205, 204.

Concurrency Control

To generalize the execution of multiple concurrent transactions, resource conflicts must be avoided and integrity constraints must be efficiently enforced. Because the execution on the physical layer 205 (phase 2) is typically orders of magnitude more expensive than execution on the logical layer 204 (phase 1), the design may be simplified by only using a single operating system ("OS") thread to perform logical layer 204 simulation, thus eliminating the need for latches (i.e., OS locks) in the transaction manager.

Figure 6:
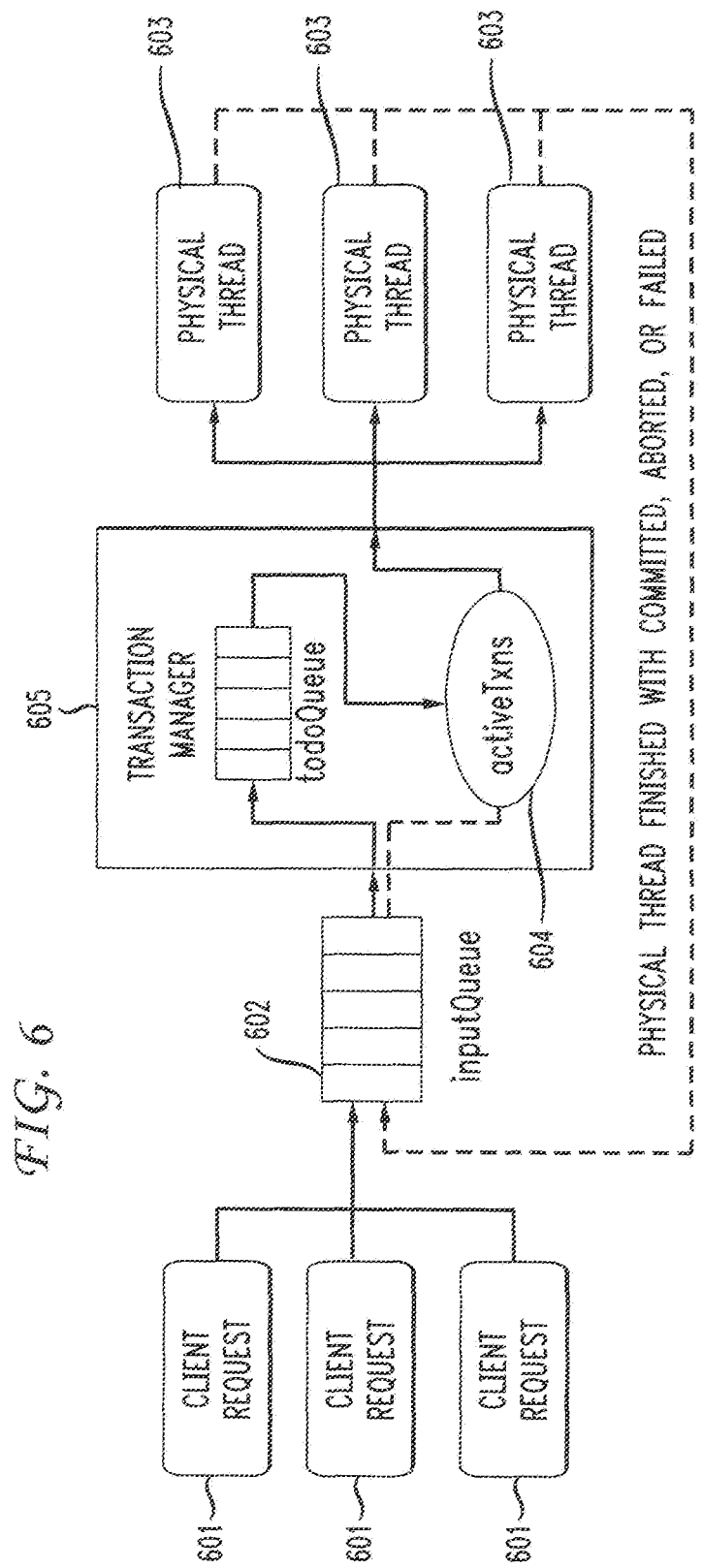
FIG. 6 is a schematic of exemplary transaction processing in one embodiment of the disclosed technology.

The components to execute concurrent transactions, in one embodiment of the disclosed technology, are depicted in FIG. 6. Transaction requests, 601 are obtained from client threads. The client thread communicates with clients to accept requests and send back execution results. A request 601 is added to the tail of inputQueue, 602, a queue for inter-thread communication. The transaction manager thread is the only consumer of the queue. The pseudo code of the transaction manager is shown in FIGS. 7A and 7B. Its job is to gather requests, execute phase 1 on the logical layer 204 (lines 23-39), detect resource conflicts (lines 25-31), find an idle thread in the thread pool to execute phase 2 on the physical layer 205 (via physical threads, 603 in FIG. 6), and send the result back to the client thread via 606 in FIG. 6. In what follows, we discuss a few important aspects of the transaction manager, 605 in FIG. 6, in implementing concurrency control.

State Management.

Suppose that currently there are n concurrent transactions $t_0, t_1, \ldots, t_{n-1}$ running. As a result, there are $2^n$ potential outcomes $S_0, S_1, \ldots, S_{2n-1}$, because each transaction can be either committed or aborted. When a new transaction request $t_n$ arrives, the potential number of outcomes doubles: for each existing state $S_i$, it will remain unchanged if $t_n$ aborts, or it will change to $S_2{}^n{}_{+1} = t_n(S_i)$ if $t_n$ does not abort.

Lock-Based Concurrency Control

Via $2^n$ logical simulations, one embodiment of the disclosed technology not only guarantees no constraint violation, but also detects race conditions based on locking. Consider next transaction nextTxn. If it is parallelizable, its touched resources are conflict-free with currently active transactions and the logs are identical (same series of actions and queries) across $2^n$ simulations. This holds vice versa, since the affected resources are limited to nextTxn and all of them end up in same states across simulations. One embodiment of the disclosed technology detects parallelizability in this way.

As shown in FIG. 7A, line 25-31, the function simulate returns the logs and locks of nextTxn, along with newstate. In this process, all actions and queries are obtained by executing stored procedures in phase 1. Note that an action and a query on a resource object correspond to write and read lock, respectively. To actually acquire the locks on the tree data model, one embodiment of the disclosed technology uses multi-granularity locking, a lock-based pessimistic concurrency control algorithm, where all ancestors of a write lock (W) are marked as intention write (1W), and all ancestors of a read lock (R) are marked as intention read (IR). W conflicts with all locks, and IW only conflicts with R. One embodiment of the disclosed technology first checks whether the current transaction is free of conflicts with all other active transactions by trying to acquire locks, and then compares the logs across simulations to make sure they are identical. After parallelizability checking, one embodiment of the disclosed technology schedules nextTxn by placing it in activeTxns_ (604 in FIG. 6).

Alternative Locking Scheme

The exponential cost to execute concurrent transactions is necessary to enforce integrity constraints under the locking scheme. An alternative and more traditional approach is to use locks only. Specifically, when a write operation is performed on a node, we find the highest ancestor A that has constraints defined, and put a read lock on that node. As a result, all the descendants of A are read-only to other concurrent transactions during the execution, hence preventing others from making state changes to break integrity. However, the lock granularity is very conservative with limited parallelism. For example, if there is a constraint defined on the root, then every transaction would have a read lock on the root so that no other write transactions can proceed concurrently. In databases, there has been extensive research on predicate locking to refine lock granularity. However, the problem is NP-hard and is considered too expensive to implement. Since logical layer 204 operations are orders of magnitude faster than physical layer executions, exponential cost at the logical layer 204 is acceptable under moderate concurrent load. Opportunistic transactions may be used as an alternative to reduce the overhead to linear.

Cross-Layer Consistency Maintenance

Although one embodiment of the disclosed technology tries to maintain consistency between the logical and physical layers 204, 205, the following cases, for example, may inevitably leave the two out of sync: (i) During the physical layer 205 execution (phase 2), an error triggers the rollback procedure, and the execution of an undo action fails. The transaction is terminated, as failed, with logical layer 204 fully rolled back, and physical layer 205 partially rolled back. (In this embodiment one may choose to stop executing undo actions on the physical layer 205 as long as an undo action reports an error, because they might have temporal dependencies.) (ii) Intentional out-of-band changes to physical devices may also cause inconsistencies. For example, an operator may add or decommission a physical resource, or an operator may log in to a device directly and change its state via the CLI without using the disclosed technology. (iii) An unintentional crash or system malfunction may change the resource's physical state without a respective change to the logical layer 204. At the scale of large data centers, these events are not rare, and embodiments of the disclosed technology gracefully handle the resulting inconsistencies.

In one embodiment of the disclosed technology, an inconsistency can be automatically identified when a physical undo action fails in a transaction, or can be detected by regularly comparing the data between the two layers. The regularity of the comparing may be, but need not be, periodic, and may even occur at irregular intervals. In another embodiment of the disclosed technology, the consistency between the logical-layer and physical-layer databases need only be checked at times that are determined by the complexity and or behavior of the databases and the systems represented by their data. In yet another embodiment of the disclosed technology a specific consistency maintenance schedule is not required, leaving that schedule to the user. Alternatively, one can periodically invoke procedures to compare the two layers, and execute repair procedures to fix the problem. In the case of adding (decommissioning) a device, one can also manually invoke a reload procedure to add (decommission) that device to (from) the system.

Once an inconsistency is detected on a node in the tree, the node and its descendants may be marked inconsistent to deny further synchronized transactions until the inconsistency is reconciled. To reconcile inconsistencies, logical-only and physical-only transactions may be applied in a disciplined and reliable way. A user can invoke a logical-only transaction to "reload" the logical model from the physical state, or invoke a physical-only transaction to "repair" the resources by aligning them with the logical model. The logical and physical only transactions may be executed in the same transaction manager, concurrently with other synchronized transactions.

In one embodiment of the disclosed technology, no physical execution is needed to execute a logical-only transaction. This eliminates the need to start a physical thread for phase 2. However, it may be beneficial to ensure that the transaction is parallelizable given the currently active transactions, and does not violate any constraints. If any constraints are violated, one embodiment of the disclosed technology aborts the transaction. This is similar to the approach for synchronized transaction executions in phase 1.

To execute a physical-only transaction, an extra step may be added to the beginning of phase 1 in synchronized execution, to first overwrite the logical layer state with physical layer state. Then the rest of the transaction is executed as if it were a synchronized transaction. A physical-only transaction restores the logical layer state and guarantees it is intact after execution by invoking corresponding repairing procedures. Hence in this process no constraint violation should be found.

Opportunistic Transaction

The concurrency control algorithm discussed above maintains exponential logical states where each active transaction may either commit or abort. Our experience shows that certain operations have very high probability of success, once no error is detected during phase 1 execution at the logical layer 204. The idea of an opportunistic transaction is to leverage this fact and only keep the successful case.

Suppose that, in one embodiment of the disclosed technology, there are $2^n$ existing states $S_0, S_1, \ldots, S_{2^n-1}$. To opportunistically schedule a new transaction request t, we only keep the new states $\{S'_0, \ldots S'_{2^{n-1}}\}$, where $S'_i = t_n(S_i)$ after phase 1. Note that the amount of states remains the same instead of doubled. After the physical execution in phase 2, if successful, the opportunism pays off: no semantics are compromised compared to the default algorithm and there is no need to discard any states.

In this embodiment, if the execution in phase 2 fails and the transaction is rolled back in the physical layer 205, we can still roll back every current logical state $S'_i$ to $S_i$, based on the undo actions in the log, to compensate the state changes made by the transaction. Suppose that there are k undo actions sequentially recorded on the log $a_1, \ldots, a_k$, the logical state $S_i$ can be recovered as $a_1 (a_2 \ldots a_k(S'_i) \ldots ))$. However, there is no guarantee that every new logical state $S_i$ after rollback satisfies the constraints, because other transactions can be executed during phase 2 of t's execution. In the case of no constraint violation, the opportunistic transaction still behaves exactly the same as a normally scheduled transaction, and the transaction are rolled back on both layers 204, 205. Otherwise, due to our design of strong ACID properties on the logical layer 204, we choose not to roll back the state on the logical layer 204, and return the transaction as successful, but mark the related nodes as cross-layer inconsistent. Based on the service logic, a user can either use repair or reload to fix the cross-layer inconsistency.

Revisiting Semantics.

After describing how synchronized, logical-only and physical-only transactions may be executed, we now revisit the transactional semantics in one embodiment of the disclosed technology. We note that in this execution model, the ACID property is always guaranteed at the logical layer 204.

At the physical layer 205, atomicity is enforceable if: (i) each physical action is atomic; (ii) each physical action is reversible with an undo action; (iii) all undo actions succeed during rollback; and (iv) the resources are not volatile during transaction execution. The first two assumptions can be largely satisfied at design time. According to our experience, most actions, such as resource allocation and configuration are reversible. (Although not all physical actions can be undone. e.g., after a server reboots, there is no (easy) way to return the server to its pre-reboot state.) For (iii), because an action and its undo action are symmetric, the undo action usually has a high probability of success given the fact that its action has been successfully executed in the recent past during the transaction.

The integrity property on the physical layer 205 is guaranteed as long as there is no cross-layer inconsistency. Isolation is enforced on the physical layer 205 due to concurrency control in phase 1. Durability is achievable on the physical layer 205 because the state of the physical resources have changed when the transaction is finished as committed, unless the resources become volatile for external reasons outside of one embodiment of the disclosed technology.

Safety, Fairness and Liveness

In one embodiment of the disclosed technology the latch-free single-thread transaction manager naturally guarantees mutual exclusion and no deadlock under multiple transaction request threads. For fairness, one embodiment of the disclosed technology adopts a first come first serve (FCFS) scheduling for waiting transactions. This is achieved via the use of a queue (line 4 in FIG. 7A).

In this embodiment of the disclosed technology, transaction liveness is guaranteed because whenever a transaction t finishes (either committed or aborted), the locks on resources touched by t will be removed so that blocked transactions can progress. However, sometimes a transaction hangs in physical layer 205 indefinitely. For instance, a VM migration could experience a network disconnection. In such cases, users can kill the transaction by manually raising an exception signal to the hanging physical thread 603, which causes both logical and physical layer 204, 205 to roll back. This resembles the logic that a transaction aborts when encountering an error in phase 2. If the physical thread 603 is unresponsive, it can be "brutally" killed and only the logical layer 204 is aborted, with related locks removed. This resembles the logic that the transaction failed in phase 2 during undo.

Complexity Analysis

In one embodiment of the disclosed technology, the complexity of the default concurrent transaction scheduling algorithm is exponential in logical layer 204 overhead. Suppose each transaction has a total execution time of L+P, where L and P are times spent on the logical and physical layers. If concurrently executing N such transactions, the average time per transaction is $2^{N-1}L + P/N$, since logical overhead is exponential and physical layer 205 is paralleled. Given that logical execution is orders of magnitude faster than physical execution, i.e., $L \ll P$, we have a speedup ratio: $R = (L+P)/(2^{N-1}L + (P/N)) \sim P/(2^{N-1}L + (P/N)) \sim 1/(2^{N-1}(L/P) + 1/N)$.

In the above equation, R grows as L/P decreases, which means either faster logical execution or longer physical execution. In this embodiment of the disclosed technology, N cannot be either too large (incurs too much logical overhead) or too small (falls backs to pure sequential). Hence a moderate N maximizes R given a fixed L/P. In essence, it makes a trade-off between logical layer 204 overhead and physical layer 205 parallelism.

Given the use of opportunistic transactions, the logical layer 204 overhead is linear with a factor of a to the logical overhead L. If we assume $\alpha L \ll P/N$, we have $R_{opp} = (L+P)/(\alpha L+(P/N)) \sim P/((P/N)) = N$. This equation shows that the use of opportunistic transaction achieves parallelization with factor of N (linear) scaling.

A SPECIFIC EMBODIMENT OF THE DISCLOSED TECHNOLOGY

The specific embodiment described below is based on the design described above.

Language choice. Python, the implementation language we chose for this embodiment, is not known to provide high performance compared to C/C++. However, it has rich libraries and a large community, and its syntax is highly readable and provides multiple high-level language features (e.g., meta programming, function decoration, list comprehension) that make it easy to embed a domain-specific language (DSL) inside. This enables the use of succinct and expressive syntax to define resource models and orchestration logic, as partially demonstrated in the example code in FIG. 4, and hides the complexity of transaction processing behind the scene. With Python, one can write queries, actions and stored procedures, and customize a variety of constraints, as in this embodiment. Additionally, Python's is popular among administrators and cloud users.

Concurrent Data Structure Optimization.

A frequent operation in accordance with the disclosed technology is to duplicate, in the logical layer 204, a state represented in a tree data structure. For example, before executing a transaction on the tree, one embodiment of the disclosed technology first makes a copy of the current state, so that in case the transaction is aborted, the logical layer 204 can be rolled back directly to the old copy. When the tree contains many nodes, a naïve deep copy becomes very expensive. In this embodiment of the disclosed technology, we adopt the copy-on-write technique for trees, which is also used in other transaction management systems. As showed in FIG. 8, instead of updating a tree node F in place, we generate a new copy F', and replace its parent nodes, up to the root. Using reference counts to track usage, the old nodes will be automatically garbage collected when they are no longer required.

In the copy-on-write data structure, each tree node is immutable. As an optimization, cached (materialized) copies of views are maintained. Interestingly, since the resulting graph is immutable, old cached copies need not be invalidated in the middle of a transaction. At the end of a logical layer simulation, when a transaction succeeds, the original tree is updated, and consequently, materialized views and constraints that involve the updated nodes are reevaluated.

Since the logical layer 204 overhead is highly dependent on the efficiency of the tree data structure, in this embodiment of the disclosed technology an automatic Python-to-C compiler, called Cython, was used to generate efficient C code. Cython generates ~23K lines of C code from the original ~1 K lines of Python code. While the generated C code is not as efficient as an equivalent C module written from scratch, the generated code results in noticeable performance improvement over the Python implementation.

Modeling Cloud Resources.

One immediate task in this embodiment of the disclosed technology is to take existing cloud resources and model them using disclosed programming environment. Following is a description of modeling a few representative resources.

In this specific implementation, we use GNBD and DRBD as storage resources, Xen as a compute resource, and Juniper routers as a network resource. These three classes of resources provide very different APIs for orchestration. GNBD and DRBD rely on text-based configuration files and CLIs to update resource roles and other states in the kernel. Xen provides its own APIs, but is also compatible with a generic set of virtualization APIs from libvirt, a configuration toolkit that works with a variety of virtualization technologies. The process of building data models for GNBD, DRBD and libvirt on Xen is entirely manual, requiring user effort to define entities and relationships, and wrapping their API calls to actions in one embodiment of the disclosed technology.

In contrast, since Juniper routers use the XML-based NETCONF protocol for configuration, we are able to automatically import the XML scheme into one embodiment of the disclosed technology's tree model. The only remaining work is to develop router actions (e.g., configuration commit) and constraints (e.g., network protocol dependencies).

Client Interface.

In this embodiment of the disclosed technology, once resources, actions and constraints are modeled, operators can directly issue cloud orchestration commands using an XML-RPC-over-HTTP interface that invokes stored procedures to execute cloud operations. This embodiment of the disclosed technology supports multiple clients and simultaneous transaction requests, either synchronous (block until the transaction finishes) or asynchronous (return immediately with a transaction ID for querying output later) and utilizes an interactive command-line shell and a visualization tool.

Support for Testing and Debugging.

One of the challenges in deploying cloud services at scale is the lack of proper testing and debugging tools. The challenge is caused by long physical operation execution time, software/hardware errors, hardware failures, complex system configuration, and resource limitations. One embodiment of the disclosed technology offers a simulation-only mode to simplify testing and debugging. In this mode, the physical execution discussed above is bypassed, and instead various scenarios in the logical layer simulation (phase 1) are studied first. Using simulation, arbitrary configurable resources types and quantities can be easily plugged in to study their possible impact on the cloud. This enables the rapid pinpointing any potential errors and performance bottlenecks prior to actual deployment.

AN IMPLEMENTED SPECIFIC EMBODIMENT

We now discuss an implementation of a specific embodiment of the disclosed technology on 16 physical machines (one used as the controller) geographically dispersed across 3 data centers. Each physical machine has 32 GB memory, with either quad-core 2.3 GHz AMD Opteron 2356 (5 hosts), or 8-core 3.0 GHz Intel Xeon E5450 (10 hosts) CPU processors, and runs CentOS Linux 5.5. Machines within each data center are connected via Gigabit Ethernet, while a layer-2 VPN provides inter-datacenter connectivity.

In what follows, we discuss a sampling of scenarios that highlights the ease of using the disclosed technology, and also its role in enforcing safety in the presence of concurrent transactions and resource volatility:

VM Memory Constraint.

A common operation performed in cloud orchestration is starting a VM. As mentioned in above, when starting VMs on a host, it is necessary to guarantee that there is enough memory, otherwise the host machine might freeze and cause significant service disruption. One embodiment of the disclosed technology avoids this with ease by adding a constraint that aggregated VMs memory cannot exceed the host's capacity (lines 12-15 in FIG. 4.)

VM Creation Error.

When starting a VM in Xen, the Xen daemon may occasionally fail with an "out of memory" error, even though the server still has enough memory. This error usually happens when the server is under high load. In this scenario, the VM creation transaction succeeds in the logical layer 204 without any constraint violations, but fails when performing the actual physical operation. Fortunately, one embodiment of the disclosed technology's atomicity guarantees ensure that the VM image and configuration files are deleted automatically as part of the transaction rollback. This avoids an undesirable scenario where a failed VM creation operation results in the cloned disk image and configuration files become "orphans", occupying resources and possibly disrupting future VM creations, e.g., due to name conflicts.

Illegal VM Migration.

VM migration currently cannot be performed across hosts running different hypervisors, e.g., from Xen to VMWare. However, using one embodiment of the disclosed technology, a constraint is specified that ensures each hypervisor can only run VMs with its compatible type. This automatically eliminates an illegal VM migration scenario. This constraint can be enforced at the logical layer 204 before the actual migration happens at the physical layer 205.

Host Reboot and Transient Network Disconnection.

Due to volatile hardware and software failures, physical hosts sometimes crash and reboot, losing all VM states. A transiently disconnected network may also cause problems, e.g., disrupting storage replication in DRBD. One embodiment of the disclosed technology treats this as cross-layer inconsistency, and reconciles the failure by performing a physical-only transaction to re-sync the two layers. Specifically, the repair procedure first compares the states of affected storage and VMs with logical layer data, and reconnects the storage and sets their resource roles back, followed by restarting VMs by calling startVM actions. Once the repair procedure is defined, the related inconsistencies are fixed without human involvement, using one embodiment of the disclosed technology.

Concurrent Operations.

To prevent the potential race conditions during concurrent migrations, one embodiment of the disclosed technology performs logical layer simulations and race condition detection. A similar problem that can be prevented by one embodiment of the disclosed technology is when two customers request new VLANs simultaneously—the service orchestrator might end up assigning the same VLAN ID to two different customers, hence breaking network isolation. In one embodiment of the disclosed technology, the two requests have resource conflicts and are automatically serialized to prevent race condition.

Follow-the-Sun Service.

Here VMs are live migrated over a wide area network (WAN) across geographically dispersed data centers to be closer to where work is being performed. During VM migration, the IP address of the VM does not change, so existing application-level sessions are not disrupted. This involves the orchestration of various cloud resources, i.e., compute, storage and network. In one embodiment of the disclosed technology, the follow-the-sun orchestration procedure involves migrating live VMs between two of the datacenters. In this case, an error condition during the migration operation results in the automatic performance of a rollback by migrating the VM back to the source data center. The disclosed technology can easily handle these features with minimal effort by a cloud operator. Taking the SimpleCloud scenario above as an example, a typical VM related operation (e.g., migration, cloning, start/stop) requires 20~50 lines of Python, and a typical constraint can be expressed in less than 10 lines of code.

Figure 9:
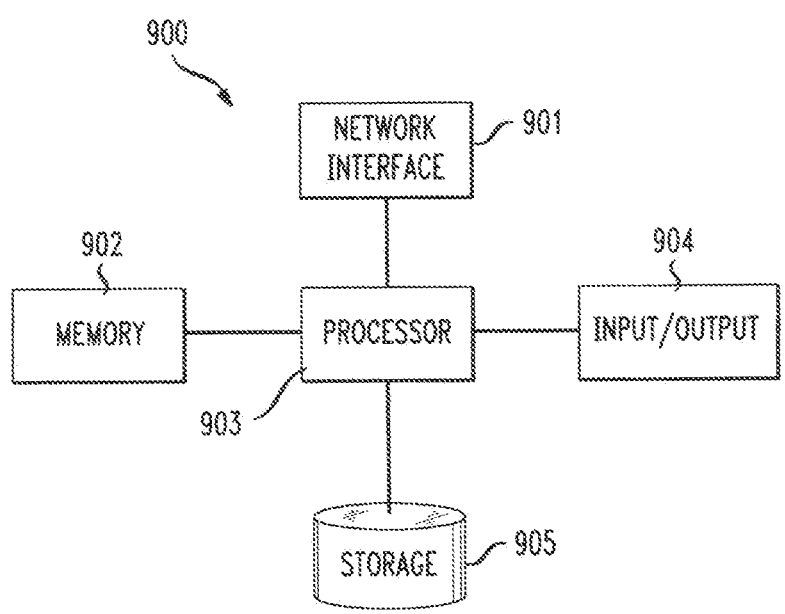
FIG. 9 is a schematic representation of a computing device that may be used in an embodiment of the disclosed technology.

FIG. 9 shows a high-level block diagram of a computer that may be used in implementing the disclosed technology. Computer 900 contains a processor 903 that controls the overall operation of the computer by executing computer program instructions which define such operation. The computer program instructions may be stored on a tangible non-transitory computer readable medium, such as storage device 905 (e.g., magnetic disk, database) and loaded into memory 902 when execution of the computer program instructions is desired. Thus, the computer operation will be defined by computer program instructions stored in memory 902 and/or storage 905, and the computer will be controlled by processor 903 executing the computer program instructions. Computer 900 also includes one or more network interfaces 901 for communicating with other devices. Computer 900 also includes input/output 904 representing devices which allow for user interaction with the computer 900 (e.g., display, keyboard, mouse, speakers, buttons, etc.). One skilled in the art will recognize that an implementation of an actual computer will contain other components as well, and that FIG. 9 is a high level representation of some of the components of such a computer for illustrative purposes. It will also be understood by one skilled in the art that the method of the disclosed technology may be implemented on a device such as is shown in FIG. 9 by, for example, utilizing appropriate computer instructions in accordance with this disclosure herein.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiment of the disclosed technology shown and described herein are only illustrative of the principles of the claimed invention and that various modifications may be implemented by those skilled in the art without departing from the scope and spirit of the invention. Those skilled in the art could implement various other feature combinations without departing from the scope and spirit of the invention. Accordingly, it should be understood that the claimed invention may be broader than any given embodiment described in this specification, or than all of the embodiments when viewed together. Rather these embodiments are meant to describe aspects of the disclosed technology, not necessarily the specific scope of any given claim.

The invention claimed is:

1. A method comprising:
replicating, at a logical layer of a memory device, a first state associated with a physical device, wherein the first state is stored at the physical device as a physical layer, and wherein replicating the first state associated with the physical device at the logical layer of the memory device causes the first state associated with the physical device to be stored also at the logical layer of the memory device;
executing, at the logical layer of the memory device, actions of a transaction, wherein executing the actions of the transaction at the logical layer of the memory device causes a first change, at the logical layer of the memory device, from the first state associated with the physical device to a second state;
recording, during execution of the actions of the transaction at the logical layer of the memory device, an execution log, wherein the execution log comprises the actions of the transaction executed at the logical layer of the memory device;
determining, at the logical layer of the memory device, whether the first change, at the logical layer of the memory device, from the first state associated with the physical device to the second state satisfies a constraint;
in response to determining that the first change, at the logical layer of the memory device, from the first state associated with the physical device to the second state satisfies the constraint, replaying, at the physical layer, the actions of the transaction of the execution log to execute the actions of the transaction at the physical layer and cause a second change, at the physical layer, from the first state associated with the physical device to the second state;
after successfully executing a portion of the actions of the transaction at the physical layer, determining that an action of the actions of the transaction fails at the physical layer; and
in response to determining that the action of the actions of the transaction fails at the physical layer,
reversing, at the logical layer of the memory device, the second state back to the first state associated with the physical device,
identifying, at the physical layer, the portion of the actions of the transaction that successfully executed, and
implementing, at the physical layer, an undo action for each of the portion of the actions of the transaction that successfully executed at the physical layer, the undo action for each of the portion of the actions of the transaction being executed in a reverse chronological order from an order of execution of the portion of the actions of the transaction at the physical layer.

2. The method of claim 1, further comprising comparing the logical layer of the memory device with the physical layer for consistency.

3. The method of claim 2, further comprising in response to determining that the logical layer of the memory device and the physical layer are inconsistent, executing a logical-only transaction to reload the logical layer of the memory device based on the physical layer.

4. The method of claim 2, further comprising in response to determining that the logical layer of the memory device and the physical layer are inconsistent, executing a physical-only transaction to repair the physical layer based on the logical layer of the memory device.

5. The method of claim 1, further comprising:
determining that the undo action at the physical layer fails; and
in response to determining that the undo action at the physical layer fails, determining that the logical layer of the memory device and the physical layer are inconsistent.

6. The method of claim 1, wherein the physical device is an element in a system selected from a group consisting of a communications network, a computing facility and a manufacturing facility.

7. The method of claim 1, wherein the first state associated with the physical device is located at an address associated with a cell in a logical-layer database and wherein the logical-layer database is a semi-structured database.

8. The method of claim 2, wherein comparing the logical layer of the memory device with the physical layer for consistency is performed periodically.

9. A non-transitory computer-readable medium having stored thereon a plurality of instructions that, when executed by a processor, cause the processor to perform operations comprising:
replicating, at a logical layer, a first state associated with a physical device, wherein the first state is stored at the physical device as a physical layer, and wherein replicating the first state associated with the physical device at the logical layer causes the first state associated with the physical device to be stored also at the logical layer of the memory device;
executing, at the logical layer, actions of a transaction, wherein executing the actions of the transaction at the logical layer causes a first change, at the logical layer, from the first state associated with the physical device to a second state;
recording, during execution of the actions of the transaction at the logical layer, an execution log, wherein the execution log comprises the actions of the transaction executed at the logical layer of the memory device;
determining, at the logical layer, whether the first change, at the logical layer, from the first state associated with the physical device to the second state satisfies a constraint;
in response to determining that the first change, at the logical layer, from the first state to the second state satisfies the constraint, replaying, at the physical layer, the actions of the transaction of the execution log to execute the actions of the transaction at the physical layer and cause a second change, at the physical layer, from the first state to the second state;
after successfully executing a portion of the actions of the transaction at the physical layer, determining that an action of the actions of the transaction fails at the physical layer; and
in response to determining that the action of the transaction fails at the physical layer,
reversing, at the logical layer, second state back to the first state associated with the physical device,
identifying, at the physical layer, the portion of the actions of the transaction that successfully executed, and
implementing, at the physical layer, an undo action for each of the portion of the actions of the transaction that successfully executed at the physical layer, the undo action for each of the portion of the actions of the transaction being executed in a reverse chronological order from an order of execution of the portion of the actions of the transaction at the physical layer.

10. The non-transitory computer-readable medium of claim 9, wherein the operations further comprise comparing the logical layer with the physical layer for consistency.

11. The non-transitory computer-readable medium of claim 10, wherein the operations further comprise in response to determining that the logical layer and the physical layer are inconsistent, executing a logical-only transaction to reload the logical layer based on the physical layer.

12. The non-transitory computer-readable medium of claim 10, wherein the operations further comprise in response to determining that the logical layer and the physical layer are inconsistent, executing a physical-only transaction to repair the physical layer based on the logical layer.

13. The non-transitory computer-readable medium of claim 9, further comprising:
determining that the undo action at the physical layer fails; and
in response to determining that the undo action at the physical layer fails, determining that the logical layer and the physical layer are inconsistent.

14. The non-transitory computer-readable medium of claim 9, wherein the physical device is an element in a system selected from a group consisting of a communications network, a computing facility and a manufacturing facility.

15. The non-transitory computer-readable medium of claim 9, wherein the first state associated with the physical device is located at an address associated with a cell in a logical-layer database and wherein the logical-layer database is a semi-structured database.

16. The non-transitory computer-readable medium of claim 10, wherein comparing the logical layer with the physical layer for consistency is performed periodically.

* * * * *